(12) United States Patent
Sano et al.

(10) Patent No.: US 9,997,953 B2
(45) Date of Patent: Jun. 12, 2018

(54) BATTERY SYSTEM

(71) Applicant: Hitachi, Ltd., Chiyoda-ku, Tokyo (JP)

(72) Inventors: Yuko Sano, Tokyo (JP); Kenji Takeda, Tokyo (JP); Toshiroh Shibata, Tokyo (JP); Yuuji Nagashima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 205 days.

(21) Appl. No.: 14/937,967

(22) Filed: Nov. 11, 2015

(65) Prior Publication Data

US 2016/0156183 A1 Jun. 2, 2016

(30) Foreign Application Priority Data

Nov. 28, 2014 (JP) .................................. 2014-240734

(51) Int. Cl.
*H02J 7/35* (2006.01)
*H02J 3/38* (2006.01)
*H02J 3/32* (2006.01)

(52) U.S. Cl.
CPC ............... *H02J 7/35* (2013.01); *H02J 3/383* (2013.01); *H02J 3/32* (2013.01); *Y02E 10/563* (2013.01); *Y02E 10/566* (2013.01)

(58) Field of Classification Search
CPC ...... H02J 7/35; H02J 3/383; H02J 3/32; H02J 3/385; Y02E 10/566; Y02E 10/563
See application file for complete search history.

(56) References Cited

U.S. PATENT DOCUMENTS

2016/0218514 A1* 7/2016 Takeda .................... H02J 3/383
2016/0218551 A1* 7/2016 Sano .......................... H02J 7/35

FOREIGN PATENT DOCUMENTS

JP 2010-22122 A 1/2010

* cited by examiner

*Primary Examiner* — Jung Kim
(74) *Attorney, Agent, or Firm* — Crowell & Moring LLP

(57) ABSTRACT

Provided is a battery system including: a solar panel that generates power using solar light; a power conditioning system (PCS) for solar light that converts a direct-current power which is output from the solar panel into an alternating-current power and supplies the converted power to a power system; a secondary battery; a PCS for the secondary battery that converts direct-current power charged and discharged from the secondary battery into alternating-current power and charges and discharges the converted power to and from the power system; and a smoothing unit that calculates a target value with respect to a composite value of power which is supplied to the power system by the solar panel and the secondary battery and gives a charge and discharge command to the PCS for the secondary battery in accordance with the target value. The smoothing unit includes a sample number calculation unit, a moving average calculation unit, and data of an amount of solar radiation, a moving average of an amount of power generation of the solar panel is calculated using a predetermined number of samples in the sample number calculation unit, and the number of samples is increased and decreased corresponding to an increase or decrease in the data of an amount of solar radiation.

10 Claims, 13 Drawing Sheets

BATTERY SYSTEM

BACKGROUND OF THE INVENTION

Field of the Invention

The present invention relates to, for example, a battery system suitable for suppressing a fluctuation in solar power generation.

Background Art

In recent years, the introduction of solar power generation systems has been promoted due to environment-related issues or the like. However, since power outputs based on solar power generation have a large fluctuation depending on the weather, voltage fluctuation or frequency fluctuation of a power system associated therewith is brought about. As such a measure, a battery system for fluctuation suppression is installed on a solar power generation system, and a battery system is charged and discharged, to thereby smooth an output of the power system.

A moving average method is known in order to smooth a fluctuation in the output of a power system, and a moving average value of a power output of solar power generation is set to a composite value of power which is supplied to the power system by the solar power generation system and the battery system. As such a related art, a technique using a moving average method is disclosed in JP-A-2010-22122.

SUMMARY OF THE INVENTION

A coverage rate indicating a time rate in which the rate of fluctuation of a composite value of power which is supplied to a power system falls within a grid code is an evaluation index of smoothing, and an increase in the number of samples (moving average time) using in moving average can improve the coverage rate. On the other hand, the capacity of a battery that stores charging and discharging power of a battery system which is represented by a difference between generated power of solar power generation and a composite output increases because a discrepancy between the two becomes larger in association with an increase in the number of samples. Therefore, there is a problem in that both an improvement in coverage rate and a reduction in battery capacity are not likely to be achieved.

An object of the present invention is to provide a battery system capable of reducing in the capacity of a battery while maintaining the coverage rate of output fluctuation due to generated power of solar power generation.

There is provided a battery system including: a solar panel that generates power using solar light; a power conditioning system (PCS) for solar light that converts a direct-current power which is output from the solar panel into an alternating-current power and supplies the converted power to a power system; a secondary battery; a PCS for the secondary battery that converts direct-current power charged and discharged from the secondary battery into alternating-current power and charges and discharges the converted power to and from the power system; and a smoothing unit that calculates a target value with respect to a composite value of power which is supplied to the power system by the solar panel and the secondary battery and gives a charge and discharge command to the PCS for the secondary battery in accordance with the target value. The smoothing unit includes a sample number calculation unit, a moving average calculation unit, and data of an amount of solar radiation, a moving average of an amount of power generation of the solar panel is calculated using a predetermined number of samples in the sample number calculation unit, and the number of samples is increased and decreased corresponding to an increase or decrease in the data of an amount of solar radiation.

According to the present invention, it is possible to provide a battery system capable of reducing the capacity of a battery while maintaining the coverage rate of output fluctuation due to generated power of solar power generation.

DETAILED DESCRIPTION OF THE INVENTION

Figure 1:
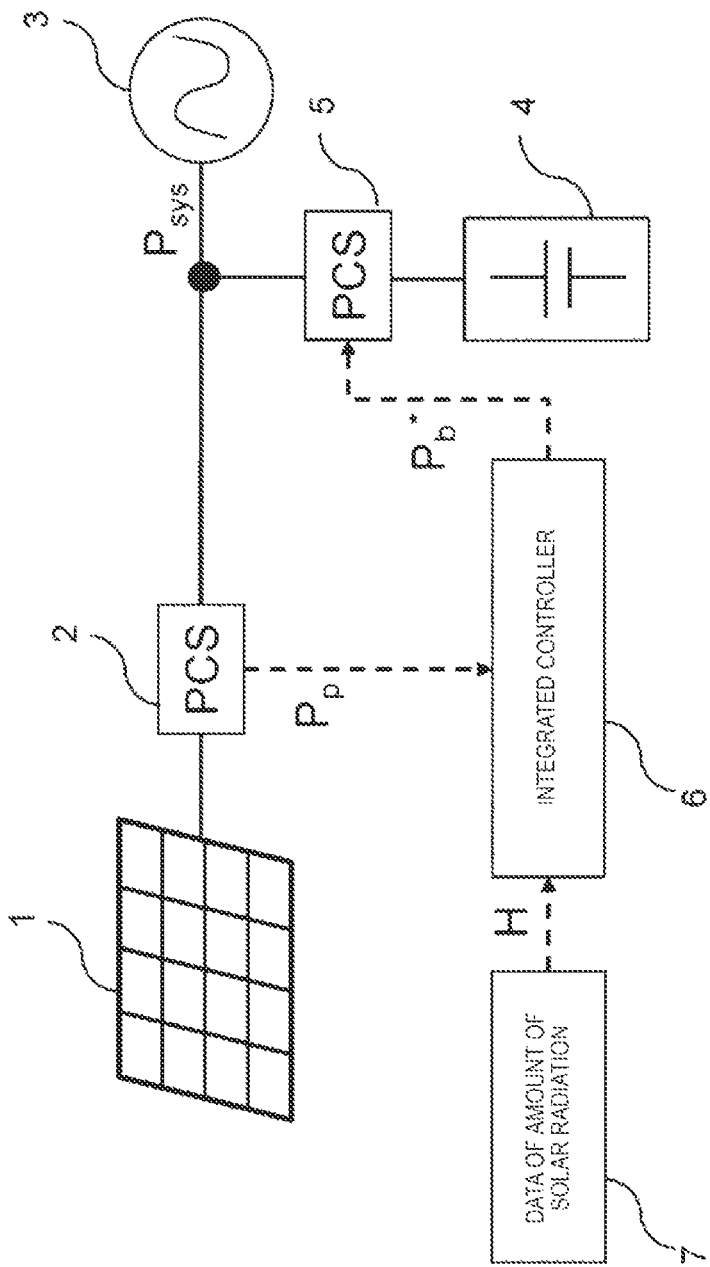
FIG. 1 is a diagram illustrating a battery system intended for fluctuation suppression in Example 1.

Hereinafter, an embodiment of the present invention will be described with reference to the accompanying drawings. In all the drawings illustrating the present invention, components having the same function are denoted by the same reference numerals and signs, and thus the repetitive description thereof may not be given.

EXAMPLE 1

FIG. 1 illustrates a configuration of a solar light battery system intended for fluctuation suppression which is a target of the present invention, and the configuration is constituted by a solar panel 1, a PCS 2 for solar light, a power system 3, a battery 4, a PCS 5 for a battery, an integrated controller 6, and data 7 of the amount of solar radiation. The solar panel 1 generates power using solar light, and the generated power is converted from a direct current to an alternating current through the PCS 2 for solar light and is supplied to the power system 3. The battery 4 charges and discharges power to and from the power system 3 through the PCS 5 for a battery. In addition, the integrated controller 6 as a smoothing unit calculates a smoothing output $P_{sys}$ obtained by suppressing the fluctuation of the power system 3 arising due to the generated power of the solar panel 1 fluctuating depending on the weather. A charge and discharge command is given to the PCS 5 for a battery, using a difference between a generated power $P_p$ of the solar panel 1 and the smoothing output $P_{sys}$ obtained by inputting the generated power $P_p$ of the solar panel 1 which is output from the PCS 2 for solar light and the amount of solar radiation H as an output $P_b$ of the battery 4.

Figure 2:
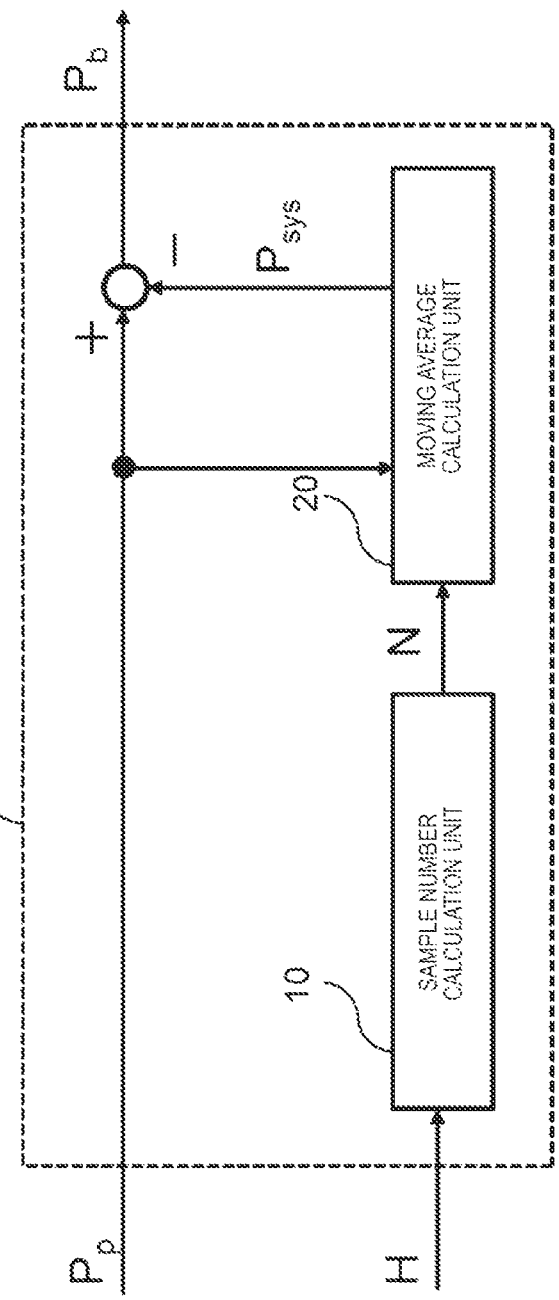
FIG. 2 is a diagram illustrating the details of an integrated controller in Example 1.

FIG. 2 illustrates the details of the integrated controller 6, and the configuration thereof is constituted by a sample number calculation unit 10 and a moving average calculation unit 20. The sample number calculation unit 10 calculates the number of samples N using the amount of solar radiation H, and inputs the resultant to the moving average calculation unit 20. The moving average calculation unit 20 calculates the smoothing output $P_{sys}$ using the generated power $P_p$ of the solar panel 1 and the number of samples N. The difference between the generated power $P_p$ of the solar panel 1 and the smoothing output $P_{sys}$ is set to the output $P_b$ of the battery 4. The moving average calculation unit 20 obtains the smoothing output $P_{sys}$ using Expression (1).

$$P_{sys} = \int_{t-t_0}^{t} \frac{P_p}{t_0} dt \quad (1)$$

Herein, t is set to a current time, and to is set to an integral interval. In addition, $T_s$ is set to a sampling period. In addition, the details of the sample number calculation unit 10 will be described later.

Figure 3:
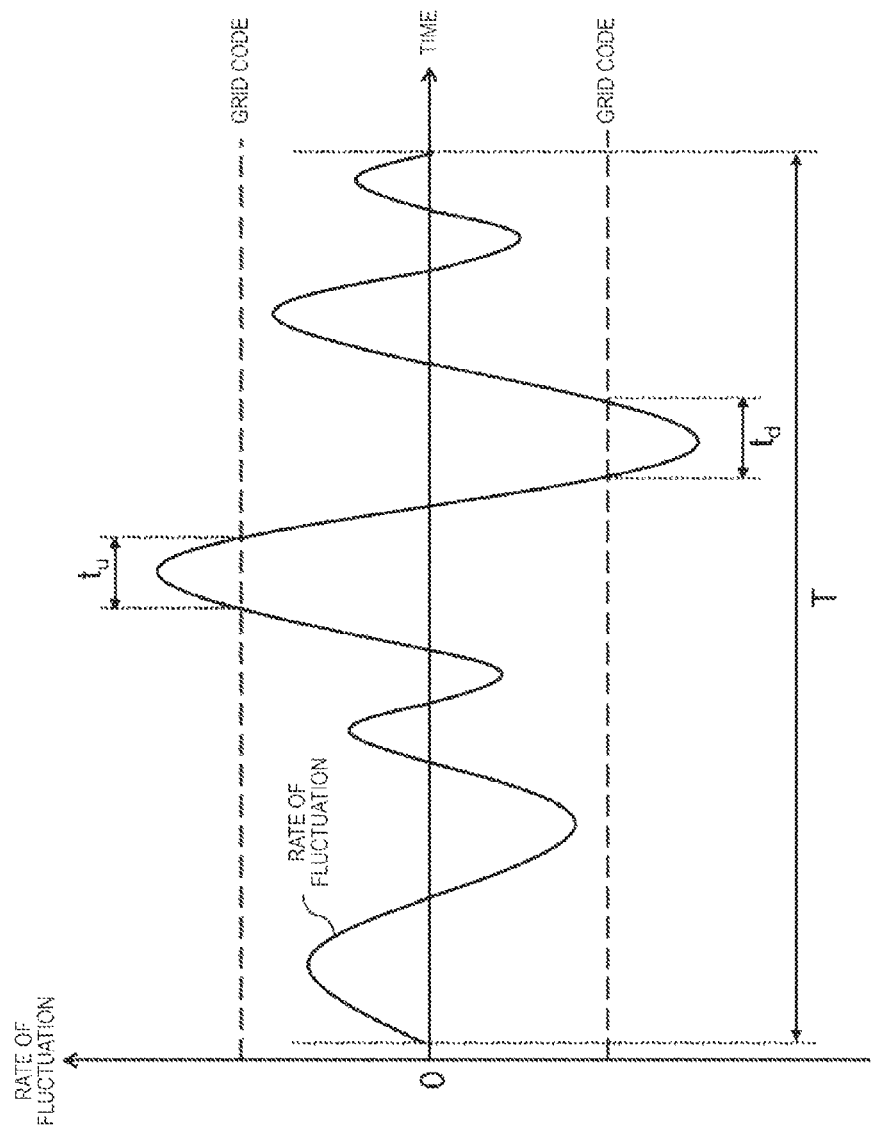
FIG. 3 is a diagram illustrating a relationship between the time and the rate of fluctuation.

FIG. 3 is a diagram illustrating the rate of fluctuation of a smoothing output. The horizontal axis represents a time, the vertical axis represents the rate of fluctuation, a waveform represents the rate of fluctuation of the smoothing output, and the rate of fluctuation is represented by Expression (2).

$$\frac{\Delta P_{sys}}{\max(P_p)} \quad (2)$$

In addition, a broken line is a grid code. Herein, T is a time, $t_u$ is a time exceeding the upper limit of the grid code, and $t_d$ is a time exceeding the lower limit of the grid code.

When a time rate in which the rate of fluctuation of the smoothing output falls within the grid code is defined as a coverage rate C, the coverage rate C is represented by Expression (3).

$$C = 1 - \frac{\sum (t_u)_i + \sum (t_d)_i}{T} \quad (3)$$

Figure 4:
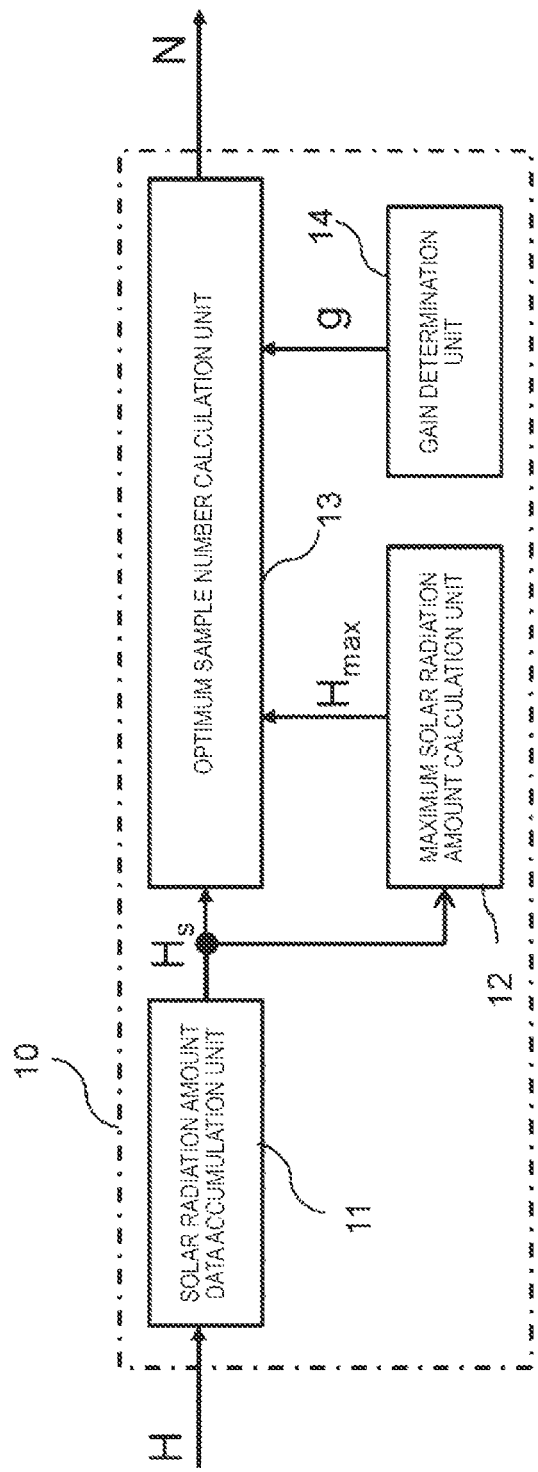
FIG. 4 is a diagram illustrating the details of a sample number calculation unit in Example 1.

FIG. 4 illustrates the details of the sample number calculation unit 10, and the sample number calculation unit 10 is constituted by a solar radiation amount data accumulation unit 11, a maximum solar radiation amount calculation unit 12, an optimum sample number calculation unit 13, and a gain determination unit 14. The solar radiation amount data accumulation unit 11 is a unit that accumulates the amount of solar radiation H acquired from a solar radiation meter or the Japan Meteorological Agency, and inputs the accumulated amount of solar radiation $H_s$ to the optimum sample number calculation unit 13 and the maximum solar radiation amount calculation unit 12. The maximum solar radiation amount calculation unit 12 calculates the maximum amount of solar radiation $H_{max}$ of a certain day from the accumulated amount of solar radiation $H_s$, and inputs the maximum amount of solar radiation $H_{max}$ to the optimum sample number calculation unit 13. Further, in the gain determination unit 14, a gain g is determined on the basis of the capacity of a battery or the coverage rate, and is input to the optimum sample number calculation unit 13. The optimum sample number calculation unit 13 determines the number of samples N using Expressions (4) and (5).

$$\alpha = \frac{H_s}{H_{max}} \quad (4)$$

$$N = \alpha \times g \quad (5)$$

Herein, $\alpha$ is the normalized amount of solar radiation.

Figure 5:
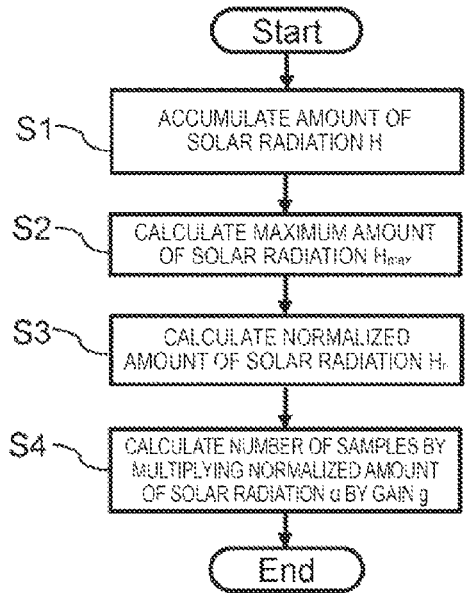
FIG. 5 is a diagram illustrating a flow diagram of the calculation of the number of samples.

FIG. 5 illustrates a flow diagram processes in FIG. 4. First, the amount of solar radiation H is accumulated in the solar radiation amount data accumulation unit 11 in step S1, and the maximum value $H_{max}$ of the accumulated amount of solar radiation $H_s$ is calculated in step S2. In step S3, the normalized amount of solar radiation $\alpha$ is calculated from the accumulated amount of solar radiation $H_s$ and the maximum amount of solar radiation $H_{max}$. Finally, in step S4, the number of samples N is calculated by multiplying the normalized amount of solar radiation $\alpha$ by the gain g.

Figure 6:
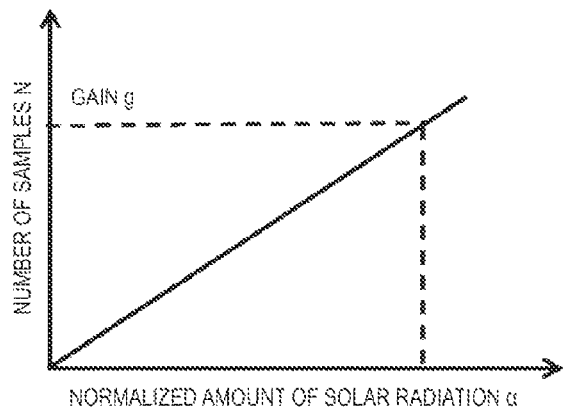
FIG. 6 is a diagram illustrating a relationship between the normalized amount of solar radiation and the number of samples.
Figure 7:
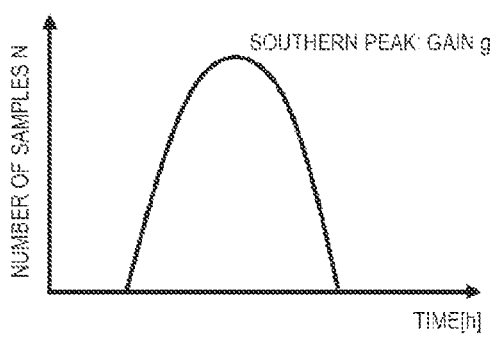
FIG. 7 is a diagram illustrating a relationship between the time and the number of samples.

FIG. 6 illustrates a relationship between the normalized amount of solar radiation $\alpha$ and the number of samples N. The number of samples N is also assumed to increase or decrease corresponding to an increase or decrease in the normalized amount of solar radiation $\alpha$. In addition, FIG. 7 illustrates a relationship between the time and the number of samples N. Since the number of samples N also increases and decreases in accordance with an increase or decrease in the amount of solar radiation H, the number of samples becomes larger in the daytime when the amount of solar radiation H is high, and becomes smaller in the morning and evening when the amount of solar radiation H is low. Since a discrepancy between the solar power generation output $P_p$ and the smoothing output $P_{sys}$ is reduced by making the number of samples variable, it is possible to reduce the capacity of a battery.

In addition, the gain g is increased and decreased and the number of samples N is changed corresponding to a change in one or both of the rate of fluctuation of the smoothing output $P_{sys}$ and the coverage rate C, thereby allowing the rate of fluctuation or the coverage rate to be caused to fall within a target value.

Figure 8:
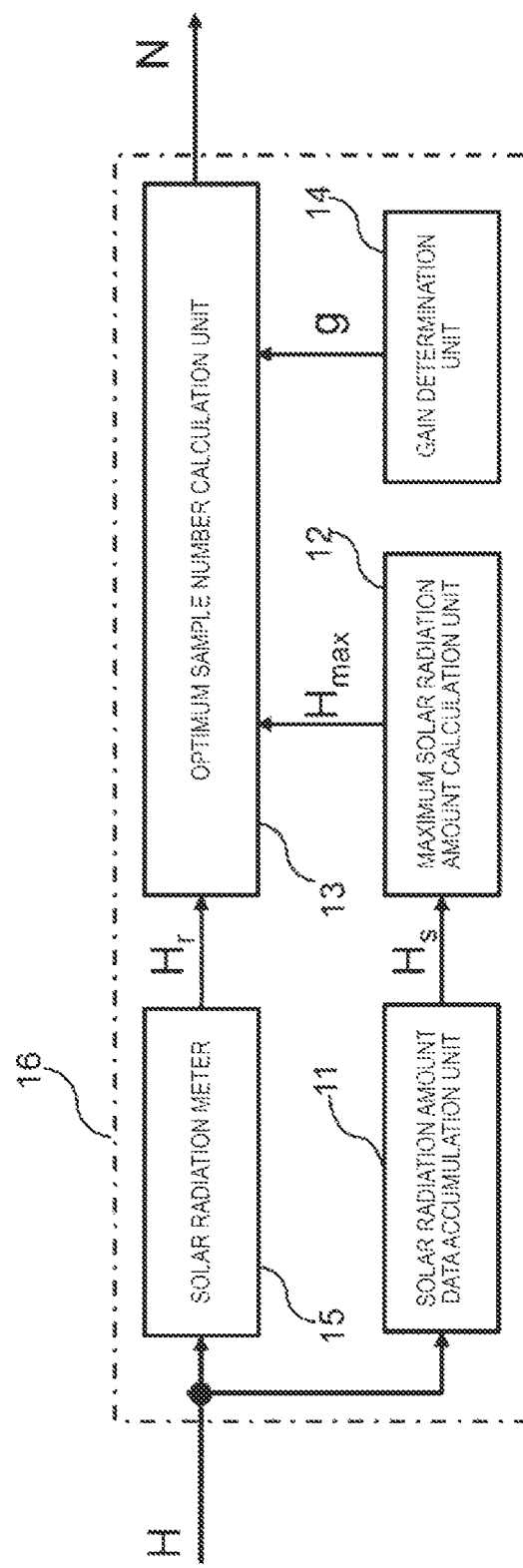
FIG. 8 is a diagram illustrating the details of the sample number calculation unit including a solar radiation meter in Example 1.

Further, in the amount of solar radiation H used for the calculation of the number of samples N, not only the accumulated amount of solar radiation $H_s$ but also the measurement data $H_s$ of the solar radiation meter can be used. FIG. 8 illustrates the details of a sampling calculation unit 16 when the solar radiation meter is added to the sampling calculation unit 10.

As in the sampling calculation unit 16, the maximum solar radiation amount calculation unit 12 uses the accumulation data $H_s$ of the solar radiation amount data accumulation unit 11, and the optimum sample number calculation unit 13 uses the measurement data H: based on the solar radiation meter 15, thereby allowing the number of samples N to be calculated. It is possible to correct the predicted amount of power generation predicted from the accumulated amount of solar radiation $H_s$ using data acquired by the solar radiation meter, and to improve the accuracy of prediction. In addition, even when the PCS capacity is smaller than the maximum amount of power generation of solar power generation, it is possible to predict the amount of solar radiation.

Figure 9:
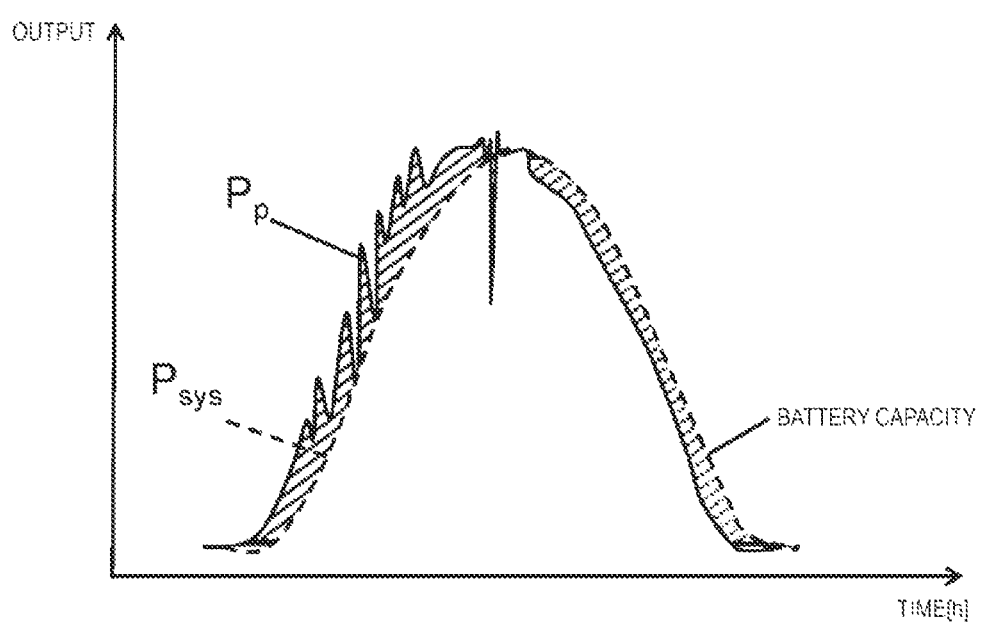
FIG. 9 is a diagram illustrating a time variation between a solar power generation output and a smoothing output.

FIG. 9 illustrates the generated power $P_p$ of the solar panel 1 and the smoothing output $P_{sys}$. The difference between the solar power generation output $P_p$ and the smoothing output $P_{sys}$ is set to charging and discharging power of a battery system, and the area of the difference indicates a battery capacity. The smoothing output $P_{sys}$ increases in the accuracy of smoothing as the number of samples N becomes larger. However, since a large discrepancy between the smoothing output $P_{sys}$ and the generated power $P_p$ of the solar panel 1 is exhibited, the battery capacity increases. Therefore, according to the present example, the number of samples N is also increased and decreased corresponding to an increase or decrease in the amount of solar radiation, thereby allowing the battery capacity to be reduced.

EXAMPLE 2

Figure 10:
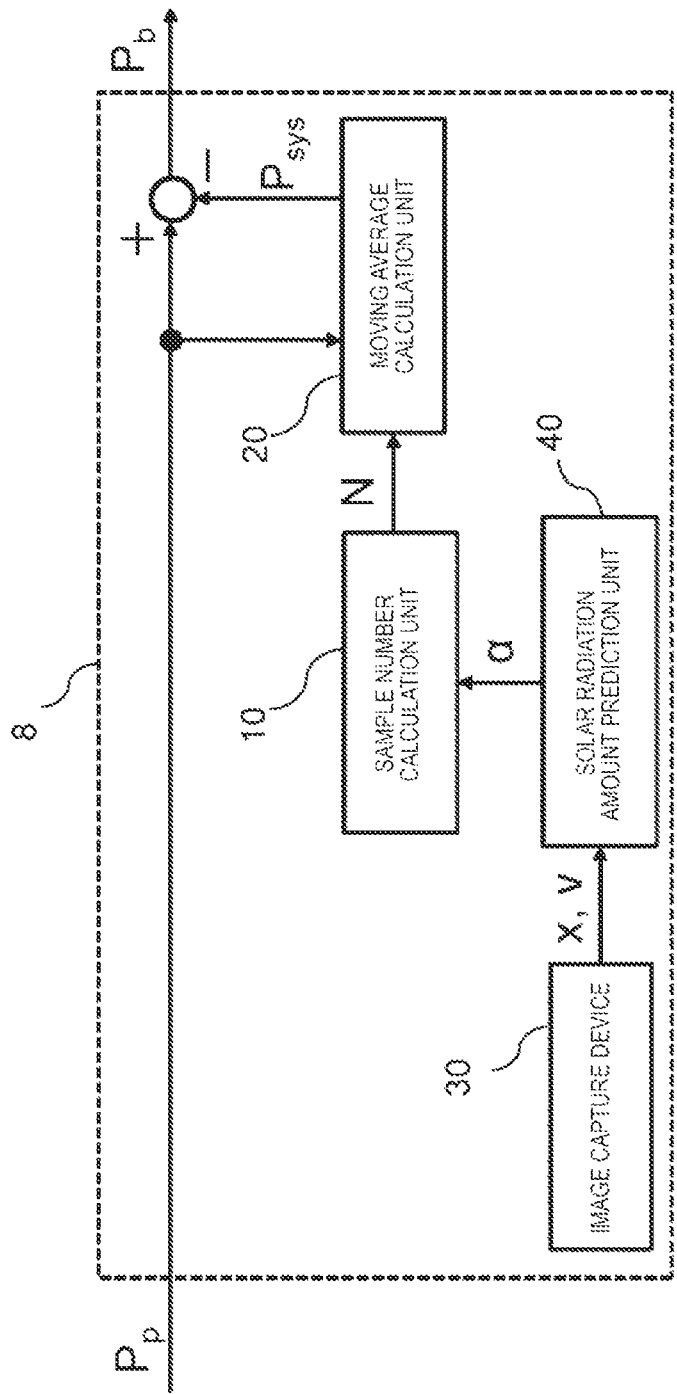
FIG. 10 is a diagram illustrating the details of an integrated controller in Example 2.

Subsequently, Example 2 will be described. Example 2 is different from Example 1, in that an image capture device 30 that captures an airspace image above the solar panel 1 and a solar radiation amount prediction unit 40 that predicts the amount of solar radiation on the basis of the acquired airspace image are included in the integrated controller 6 of Example 1. FIG. 10 illustrates a configuration of an integrated controller 8 of the present example. Meanwhile, in the present example, the configuration described in Example 1 will be described with reference to the same numbers as the drawing numbers used in Example 1.

One of factors in the fluctuation of the power output of the solar panel 1 is shielding of solar light due to the clouds. An airspace image above the solar panel 1 is captured using the image capture device 30, and the obtained airspace image is input to the solar radiation amount prediction unit 40. The solar radiation amount prediction unit 40 calculates the position of the clouds after a few seconds by obtaining a positional relationship between the sun and the clouds or a moving direction x and a moving speed v of the clouds from the airspace image obtained in the image capture device 30, and predicts the amount of solar radiation. The amount of solar radiation obtained is substituted into the normalized amount of solar radiation α, and the number of samples is calculated.

Therefore, according to the present example, since the amount of solar radiation is predicted on the basis of meteorological data acquired from the airspace image, it is possible to cope with a fluctuation depending on a drastic change in weather, and to maintain the coverage rate.

EXAMPLE 3

Figure 11:
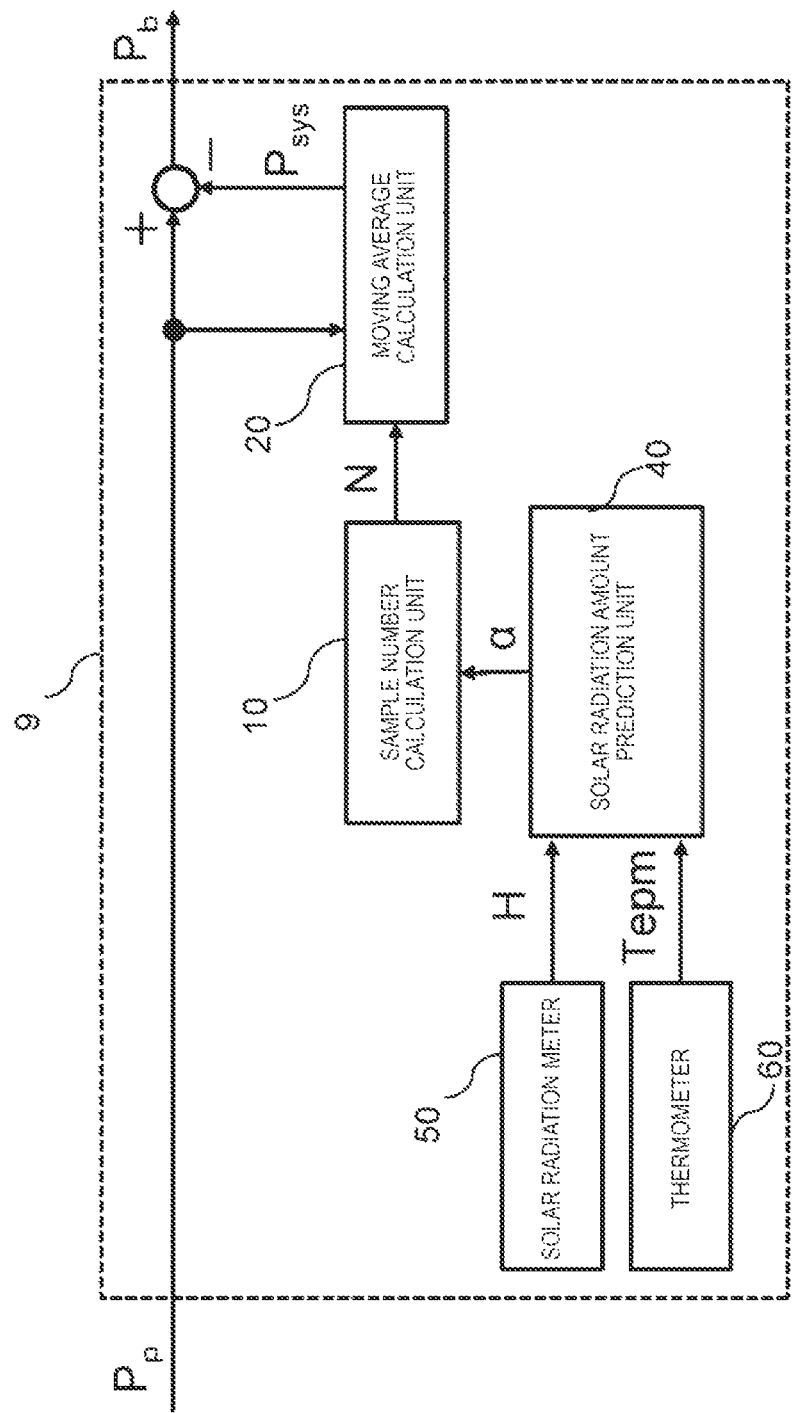
FIG. 11 is a diagram illustrating the details of an integrated controller in Example 3.

Example 3 will be described below. Example 3 is different from Example 1 and Example 2, in that a solar radiation meter 50 and a thermometer 60 are included in the integrated controller 6 of Example 1. FIG. 11 illustrates a configuration of an integrated controller 9 of the present example. Meanwhile, in the present example, the configurations described in Example 1 and Example 2 will be described with reference to the same numbers as the drawing numbers used in Example 1 or Example 2.

It can be understood that the power generation efficiency of the solar panel 1 is dependent on temperature. In addition, generated power can be predicted from the amount of solar radiation. Consequently, the solar radiation meter and the thermometer are installed, and the amount of solar radiation is predicted in the solar radiation amount prediction unit 40 on the basis of data of the amount of solar radiation capable of being acquired in the solar radiation meter 50 and temperature data capable of being acquired in the thermometer 60 and is substituted into the normalized amount of solar radiation α, to thereby calculate the number of samples.

Therefore, according to the present example, the amount of solar radiation can be predicted in further consideration of the temperature efficiency, and thus it is possible to acquire the amount of high-accuracy predicted solar radiation.

EXAMPLE 4

Figure 12:
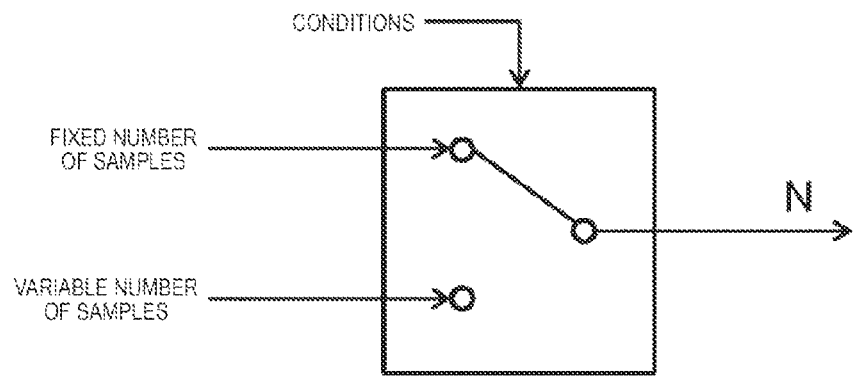
FIG. 12 is a diagram illustrating the details of a sample number calculation unit in Example 5.
Figure 13:
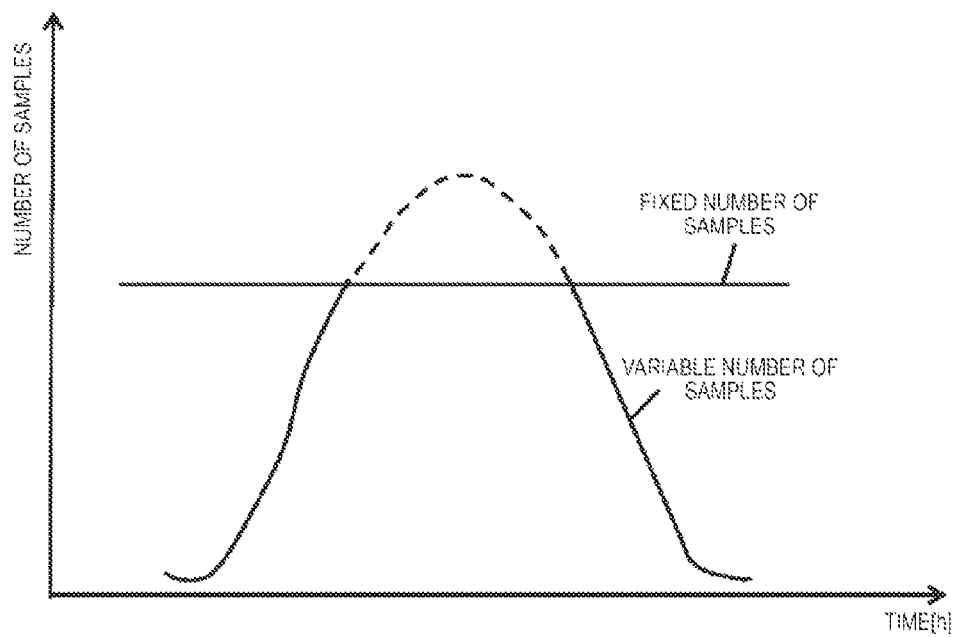
FIG. 13 is a diagram illustrating a time variation in the number of samples when the variable number of samples is larger than the fixed number of samples.
Figure 14:
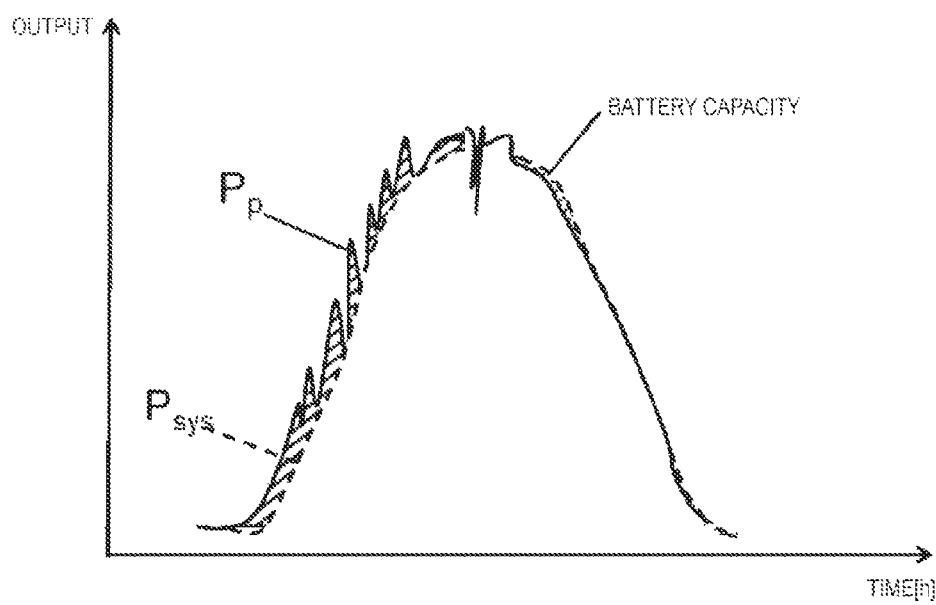
FIG. 14 is a diagram illustrating an effect of FIG. 13.

FIG. 12 illustrates a block diagram when the variable number of samples and the fixed number of samples are selected under certain conditions in the sample number calculation unit 10. For example, as shown in FIG. 13, when the variable number of samples becomes larger than the fixed number of samples in a time zone in which the amount of power generation of the solar panel becomes maximum, the fixed number of samples is selected. As a result, as shown in FIG. 14, the number of samples is reduced, and thus it is possible to reduce the battery capacity.

Figure 15:
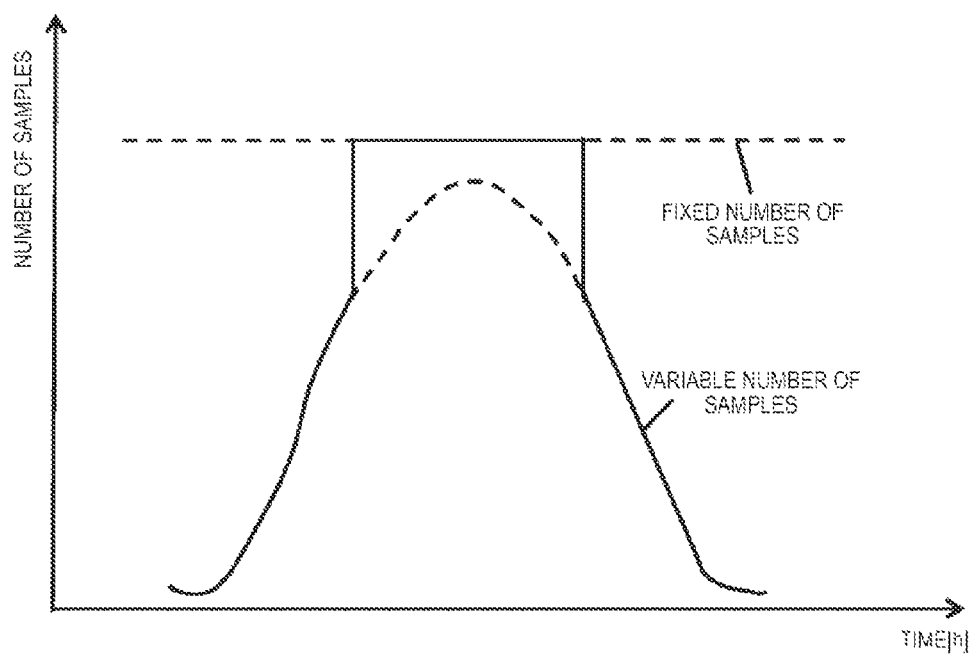
FIG. 15 is a diagram illustrating a time variation in the number of samples when the fixed number of samples is larger than the variable number of samples.
Figure 16:
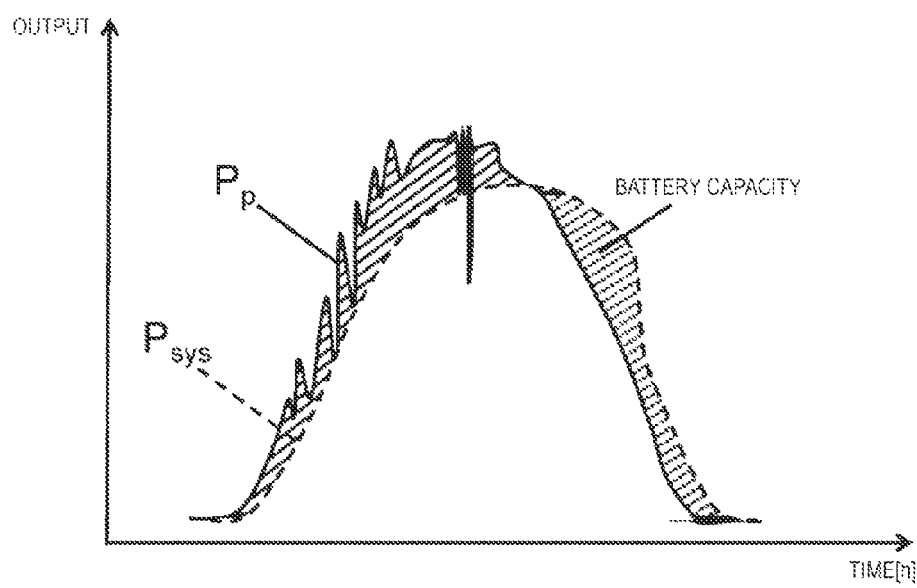
FIG. 16 is a diagram illustrating an effect of FIG. 15.

In addition, as shown in FIG. 15, when the fixed number of samples becomes larger than the variable number of samples in a time zone in which the amount of power generation of the solar panel becomes maximum, the fixed number of samples is selected. As a result, as shown in FIG. 16, even when a fluctuation becomes larger in the daytime when the amount of power generation is high, it is possible to secure the coverage rate.

EXAMPLE 5

As described in Example 1, the number of samples N is calculated from the normalized amount of solar radiation α and the gain g, and an increase in the number of samples causes a large discrepancy between the solar power generation output $P_p$ and the smoothing output $P_{sys}$. A jump in the value of the smoothing output $P_{sys}$ due to the number of samples N, particularly, near the sunrise and the sunset causes a reduction in the coverage rate C, and thus special attention is needed.

Figure 17:
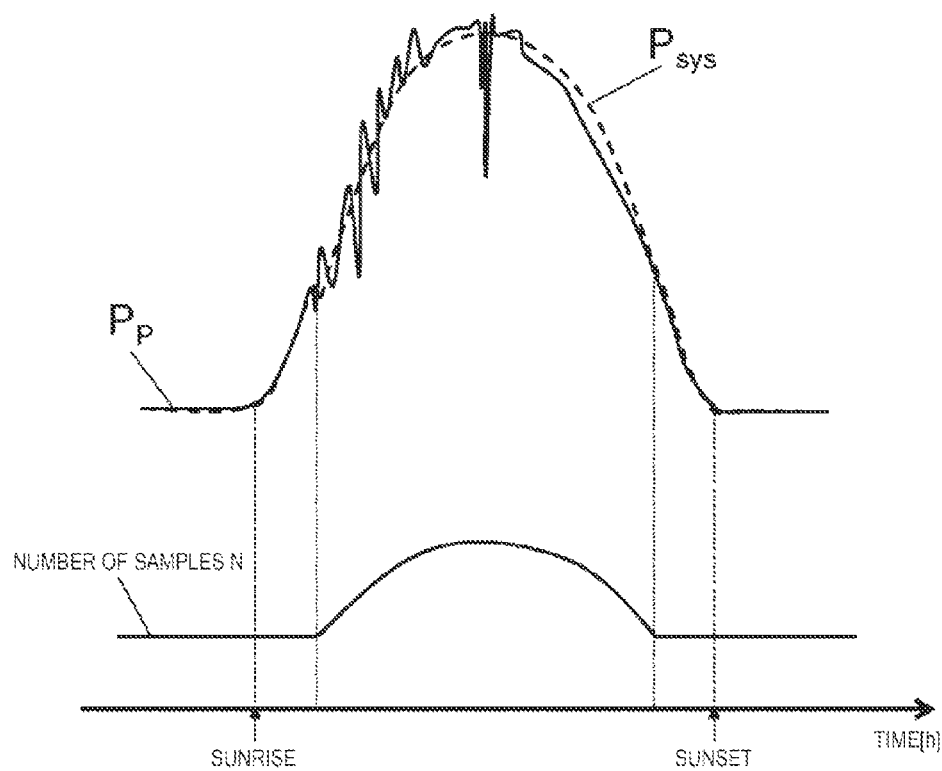
FIG. 17 is a diagram illustrating a relationship between the number of samples and an output waveform from immediately after the sunrise.
Figure 18:
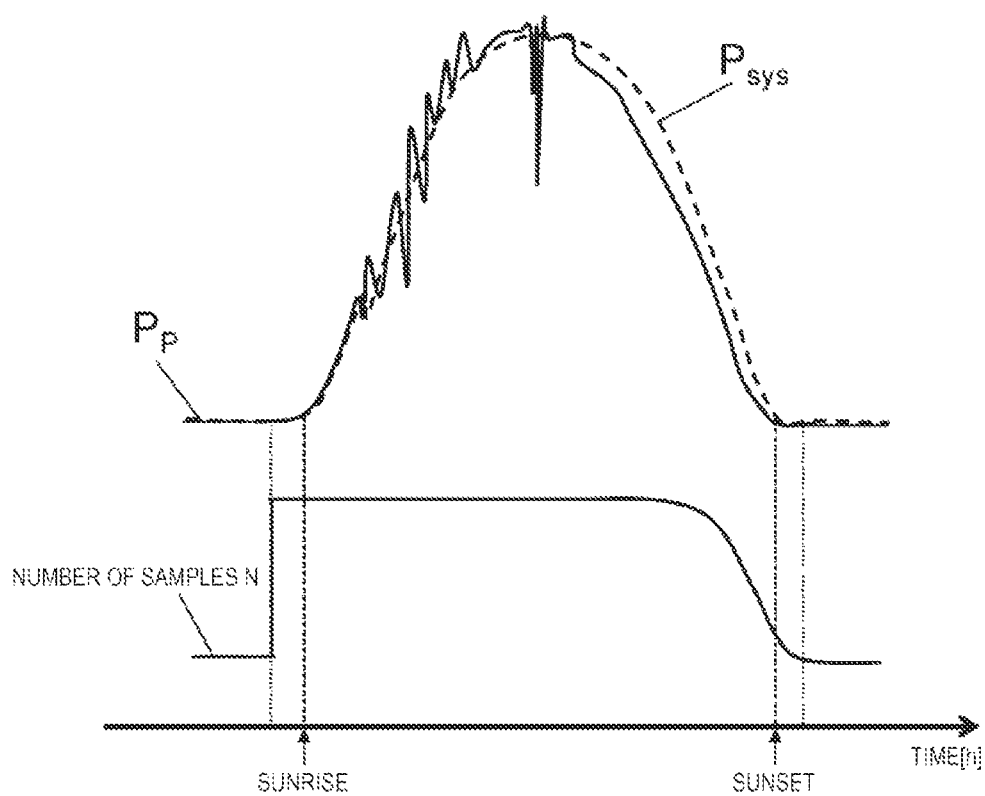
FIG. 18 is a diagram illustrating a relationship between the number of samples and an output waveform from before the sunrise.

FIG. 17 is a diagram illustrating a relationship between the solar power generation output $P_p$ and the smoothing output $P_{sys}$ when the number of samples N increases from after the sunrise and is set to 0 near the sunset. A rapid increase in the number of samples N near the sunrise causes a reduction in the coverage rate due to a rapid increase in the smoothing output $P_{sys}$, and thus it is necessary to gently increase the number of samples near the sunrise. In addition, FIG. 18 is a diagram illustrating a case where the number of samples N starts to increase from before the sunrise. Even when the number of samples N increases rapidly before the sunrise, the coverage rate C is not reduced without influencing the smoothing output $P_{sys}$. Therefore, even when the number of samples increases in a stepwise manner, a problem does not occur. On the other hand, it is necessary to gently reduce the number of samples N in order to maintain the coverage rate C near the sunset. For this reason, the number of samples N near the sunset is gently reduced in both FIGS. 17 and 18.

Therefore, according to the present example, the number of samples N near the sunrise and near the sunset is gently increased and decreased, or the number of samples N is increased from before the sunrise and is gently reduced near the sunset, and thus it is possible to reduce a discrepancy between the solar power generation output $P_p$ and the smoothing output $P_{sys}$, and to maintain the coverage rate C.

What is claimed is:

1. A battery system comprising:
   a solar panel that generates power using solar light;
   a power conditioning system (PCS) for solar light that converts a direct-current power which is output from the solar panel into an alternating-current power and supplies the converted power to a power system;
   a secondary battery;
   a PCS for the secondary battery that converts direct-current power charged and discharged from the secondary battery into alternating-current power and charges and discharges the converted power to and from the power system; and
   a smoothing unit that calculates a target value with respect to a composite value of power which is supplied to the power system by the solar panel and the secondary battery and gives a charge and discharge command to the PCS for the secondary battery in accordance with the target value,
   wherein the smoothing unit calculates a moving average of an amount of power generation of the solar panel using a predetermined number of samples, and the number of samples is increased and decreased corresponding to an increase or decrease in data of an amount of solar radiation.

2. The battery system according to claim 1, wherein the smoothing unit accumulates the data of an amount of solar radiation, and the number of samples is calculated using data of an accumulated amount of past solar radiation.

3. The battery system according to claim 1, wherein the smoothing unit includes an image capture device that captures an airspace image, acquires a positional relationship between the sun and the clouds and meteorological data including a moving speed of the clouds from the airspace image acquired in the image capture device, and predicts the amount of power generation of the solar panel from the meteorological data, and the number of samples is increased and decreased corresponding to an increase or decrease in the predicted amount of power generation of the solar panel.

4. The battery system according to claim 1, further comprising a solar radiation meter and a thermometer, wherein the amount of power generation of the solar panel is predicted using measurement data of the solar radiation meter and temperature data of the thermometer, and the number of samples is increased and decreased corresponding to an increase or decrease in the predicted amount of power generation of the solar panel.

5. The battery system according to claim 1, wherein when a capacity of the PCS for solar light is smaller than a maximum amount of power generation of the solar panel, a solar radiation meter is included therein.

6. The battery system according to claim 1, wherein the smoothing unit includes a solar radiation meter, and the number of samples calculated from the accumulated data of an amount of past solar radiation is corrected using the measurement data of the solar radiation meter.

7. The battery system according to claim 1, wherein the smoothing unit calculates a normalized amount of solar radiation of the solar panel, calculates the number of samples by multiplying the normalized amount of solar radiation by a gain, obtains a rate of fluctuation of a composite value, sets a suppression target value with respect to the rate of fluctuation, obtains a time rate in which the rate of fluctuation falls within the suppression target value, and sets an attainment target value of a coverage rate, and the gain is increased and decreased corresponding to at least one of the suppression target value and the coverage rate.

8. The battery system according to claim 1, wherein the smoothing unit is switched near the maximum amount of power generation of the solar panel.

9. The battery system according to claim 1, wherein when a variable number of samples obtained exceeds a fixed number of samples obtained, the fixed number of samples is adopted.

10. The battery system according to claim 1, wherein when the fluctuation in the amount of power generation of the solar panel is large, a fixed number of samples is adopted.

* * * * *